United States Patent
Apel et al.

(10) Patent No.: US 6,201,389 B1
(45) Date of Patent: Mar. 13, 2001

(54) DEVICE FOR DETERMINING THE ANGULAR POSITION OF A ROTATING SHAFT

(75) Inventors: Peter Apel, Suedkirchen; Klaus Wilczek, Werne, both of (DE)

(73) Assignee: AB Eletronik GmbH, Werne (DE)

( * ) Notice: Subject to any disclaimer, the term of this patent is extended or adjusted under 35 U.S.C. 154(b) by 0 days.

(21) Appl. No.: 09/202,907
(22) PCT Filed: Apr. 23, 1998
(86) PCT No.: PCT/EP98/02397
  § 371 Date: Dec. 23, 1998
  § 102(e) Date: Dec. 23, 1998
(87) PCT Pub. No.: WO98/48244
  PCT Pub. Date: Oct. 29, 1998

(30) Foreign Application Priority Data

Apr. 23, 1997 (DE) .............................................. 197 16 985

(51) Int. Cl.⁷ .............................. G01B 7/30; G01D 5/14; G01L 3/10
(52) U.S. Cl. .................... 324/207.2; 324/207.25; 73/862.331
(58) Field of Search ........................... 324/207.2, 207.21, 324/207.22, 207.25, 174; 310/68 B, 156, 168; 73/862.331–862.334

(56) References Cited

U.S. PATENT DOCUMENTS

| | | | |
|---|---|---|---|
| 3,152,261 | * 10/1964 | Carlstein | 324/207.25 X |
| 3,194,990 | * 7/1965 | Kendall | 324/207.2 X |
| 4,663,601 | * 5/1987 | Troutman et al. | 324/207.25 X |
| 4,881,414 | * 11/1989 | Setaka et al. | 324/207.25 X |
| 4,984,474 | * 1/1991 | Matsushima et al. | 324/207.25 X |
| 5,130,650 | * 7/1992 | Lemarquand | 324/207.25 X |
| 5,528,139 | * 6/1996 | Oudet et al. | 324/207.25 X |
| 5,861,745 | * 1/1999 | Herden | 324/207.2 |

FOREIGN PATENT DOCUMENTS

| | | | |
|---|---|---|---|
| 4141000 | * | 6/1992 | (DE) . |
| 295 20 111 U | * | 2/1997 | (DE) . |
| 368687 | * | 5/1990 | (EP) . |

* cited by examiner

Primary Examiner—Gerard Strecker
(74) Attorney, Agent, or Firm—Milde, Hoffberg & Macklin, LLP (57) ABSTRACT

In order to improve the measurement possibilities with regard to a rotating shaft, including the whole angle area (0 to 360°), a rotation angle sensor is mounted that is provided with a radial-bipolar ring-shaped magnetic element (3), three air gaps (5, 6, 7, 8) displaced by an equal angle (φ) being connected with said shaft, and with a stator element (4) of a magnetoconductive material, while a Hall integrated circuit element (1, 2) is inserted in at least two adjacent air gaps (5, 6, 7, 8). The two Hall integrated circuit elements (1, 2) can be connected to an evaluation unit (9) which records a voltage curve of the measured circuit for each circuit element (1, 2), assigns each flow voltage measure to a position angle on the Hall integrated circuit voltage curves, calculates from the position angles assigned to the flow voltage values the actual position angle and gives it as the start signal (A1, A2).

8 Claims, 6 Drawing Sheets

DEVICE FOR DETERMINING THE ANGULAR POSITION OF A ROTATING SHAFT

BACKGROUND OF THE INVENTION

The invention has to do with a device for determining the position and/or torsion of rotating shafts.

A rotary angle sensor for determining the position of rotating shafts is known from the international patent publication No. WO 92/107,22. A bipolar-radially magnetized annular magnet is placed on the shaft, which is enclosed by a stator. Two oppositely-placed air gaps are built into the stator. A Hall element is placed in one of the air gaps.

If the annular magnet rotates in the stator, the Hall element records only one Hall voltage curve in dependence on the position angle, which curve runs similar to a sine wave. If the shaft turns by 360°, it is thus only possible to measure in the linear area of a quadrant, or only from 0° to 90°. The rounded and flattened parts of the Hall voltage curve are unsuited for measurement purposes. In fact, if the linear area in the first quadrant from 0° to 90° is followed by another in the third quadrant from 180 to 270°, then this, by reason of the intermediate rounded and offset parts, cannot be used for measurement of a position within a full turn.

A rotary angle sensor is known from the international patent publication No. WO 95 14 911 A1. It consists of a stationary and a rotating component. The stationary component has two crescent-shaped stator component elements, which are arrayed to be opposite while retaining a spacer recess. The rotating component is an annular magnetic element which is retained by a magnet mounting unit, which is connected to a shaft.

The disadvantage is that only one Hall element is placed in the spacer recess. This makes it possible to determine only one shaft setting between 0° and 90°.

A measuring device for determining torsion of a rotating shaft is known from the German patent No. DE 42 31 646 A1. However, here two annular bodies are placed onto the shaft. The bodies are kept on the shaft by intermediate rings and equipped with teeth, between which there are gaps. By means of a plastic ring, an additional body with teeth is attached, so that an air gap results. An annular yoke is placed about the body, so that four coils are embedded in annular fashion. Projections form an additional air gap. A source of alternating current is applied to the coils, and thus an alternating magnetic field is induced. Torsion in the shaft causes a displacement of the two measuring units from each other. The resulting change of voltage in the pickup coils is therefore a measurable value.

A device to measure torsion and/or relative angular movement is described in the German patent No. DE 42 32 993 A1. In it, on one side of a first coil arrangement, a first and second annular element, shaped like pineapple or orange slices, are placed at different widths and at equal intervals. On one of the lateral surfaces of a second coil arrangement, third, fourth and fifth similarly-shaped annular segments are attached. This device measures two straight-running curves whose output signals are 0 in the crossing point, which corresponds to a torsion or angular motion.

Finally, an arrangement for determining torsion, torsion moment and/or rotary angle of at least two shafts that are connected with each other is known from the German patent No. DE 42 32 994 A1. In this patent, in the area where the two shafts are connected, there are two coil devices, which retain an air gap. The device operates according to the transformer principle. However, it only detects voltages that occur with a change in rotary angle and are dependent with that change in rotary angle.

SUMMARY OF THE INVENTION

Proceeding from a rotary angle sensor with a Hall IC element of the type known from the international patent publication No. WO 92/10772 A1, the objective of the invention is to improve the measurement options, particularly in the entire angular range from 0° to 360°. Additionally, the torsion of at least one of the rotating shafts should be able to be determined.

These objects, as well as other objects which will become apparent from the discussion that follows, are achieved, in a device for determining the position and/or torsion of a rotating shaft according to the invention by providing at least one radial-bipolar annular magnet element connected with the shaft and at least one stator element, made of a magnetoconductive material, surrounding the annular magnet element. At least three air gaps are located in the stator element, displaced one from the other at an equal angle (5). Two Hall IC elements, each of which is disposed in two adjacent air gaps, are connected to an evaluation unit which detects a Hall IC voltage curve, assigns a flux-voltage value to a position angle on the Hall IC voltage curves and calculates the de facto position angle and produces an output signal representing the position angle.

The advantages achieved with the invention are particular in that two Hall IC voltage curves are measured. Using this rotary angle sensor, it is possible to record positions of the shaft between 0° and 360°. Thus, the measurement options are multiplied by comparison with known rotary angle sensors.

Two rotary angle sensors of the type described above, according to the invention, can be placed next to each other on the shaft, thus forming a torsion sensor.

This torsion sensor is thus characterized by the following features:
a first and a second bipolar-radial annular magnet element is placed on at least one shaft,
each annular magnet is surrounded by a stator element, in which at least three air gaps are situated, displaced by the same angle, and
a Hall IC element is placed in each of the neighboring air gaps of each stator element.

The fact that two rotary angle sensors are placed on one shaft allows not only the position of the rotating shaft, but also its torsion to be determined. The torsion, or a torque moment generated, is determined by the varying current -voltage values within the Hall IC voltage curves, and issued as output. Placing two rotary angle sensors on one shaft also has the advantage that if one sensor fails, the second continues to operate precisely. Additionally, the two sensors can be used to mutually check each other's functions.

The two Hall IC elements that are placed in a stator element can be connected to an evaluation unit which
records a measured Hall IC voltage curve from each Hall IC element,
assigns each recorded current-voltage value to a position angle on the Hall IC voltage curves, and
from the position angles assigned to the current-voltage value, calculates the actual position angle, and issues it as an output signal.

Accordingly, the evaluation unit that operates in this way makes it possible to use one Hall IC voltage curve as the measurement curve and the second Hall IC voltage curve as a decision curve. Additionally, this evaluation unit makes it possible alternately to switch to the linear portions of each of the Hall IC voltage curves, so that between 0° and 360°, operations can always be conducted in a straight-running curve area. By this means, it is possible to achieve not merely a 360° measurement, but a 360° measurement with very high precision. The evaluation unit can be configured as a microcomputer or a user-computer switching circuit, also called a UCSC. It should have at least a computer (central processing unit) which is linked with a memory unit. On the input side of the computer, two analog-to-digital converters are placed which are parallel to each other. On the output side, an analog or a digital output signal appears. The analog signal can be given by a digital-to-analog converter, which is connected with the computer on the output side. If a CAN-BUS interface is connected with the computer, the digital output signal appears. In each case, one of the Hall IC elements is connected with one of the two analog-to-digital converters. The output signal appears at the digital-to-analog converter. In place of a digital computer, an analog computer can be provided, which is then able to be linked only with the memory unit. The computer permits the values determined to be evaluated easily and conveniently, and the correct angular position of the shaft to be issued as an output. For a torsion sensor, such a unit is placed on each rotary angle sensor. The difference in the various output signals can then be a measure of the torsion or torsion moment.

In each of the stator elements, four air gaps can be positioned. They are separated from each other by a 900 angle. A Hall IC element is placed on each two such adjacent air gaps. The configuration of the four air gaps ensures the balance of the overall system. The Hall IC elements that are displaced by a 90° angle produce two Hall IC voltage curves that run so as to be displaced from each other by 90°. This ensures that in each quadrant, a linear area of the Hall IC voltage curve is positioned, so that determination can be made of the position between 0° and 90°, 90° and 180°, 180° and 270°, and between 270° and 360°. One of the two Hall IC voltage curves forms the decision curve. The Hall IC voltage curves take on the function of the decision curve particularly where they run curved and flattened. The linear, ascending run of the particular curve, on the other hand, is used in advantageous fashion as a measurement curve.

Each annular magnet element can be held by an annular magnet mounting element. The annular magnet mounting element can be connected with the shaft. In particular, the annular magnet mounting element makes it easy to adjust and mount the annular magnet element.

If torsion is being measured, an axially running tongue can be cleaved away from the shaft and held at one end. Due to this change in cross section, torsion of the shaft can be measured exactly. Instead of the tongue, the cross section of the shaft can be reduced in a certain section for torsion measurement. Intermediate placement of an elastic material between two stiff shaft ends is also possible. The shaft can also be configured to be split. A rotary angle sensor is then positioned on each shaft section in the area of the connection. This rotary angle sensor can be interconnected to a common torsion sensor.

Each stator element can at least be surrounded by a housing. With a rotary angle sensor, the housing is simultaneously the outer border of the sensor. In a torsion sensor, two such housings can be used. However, both stator elements can be surrounded by a common housing, which also encloses the area of the torsion measurement section.

The invention is depicted in the drawings and described in greater detail hereinbelow For a full understanding of the present invention, reference should now be made to the following detailed description of the preferred embodiments of the invention as illustrated in the accompanying drawings.

DESCRIPTION OF THE PREFERRED EMBODIMENTS

Figure 1:
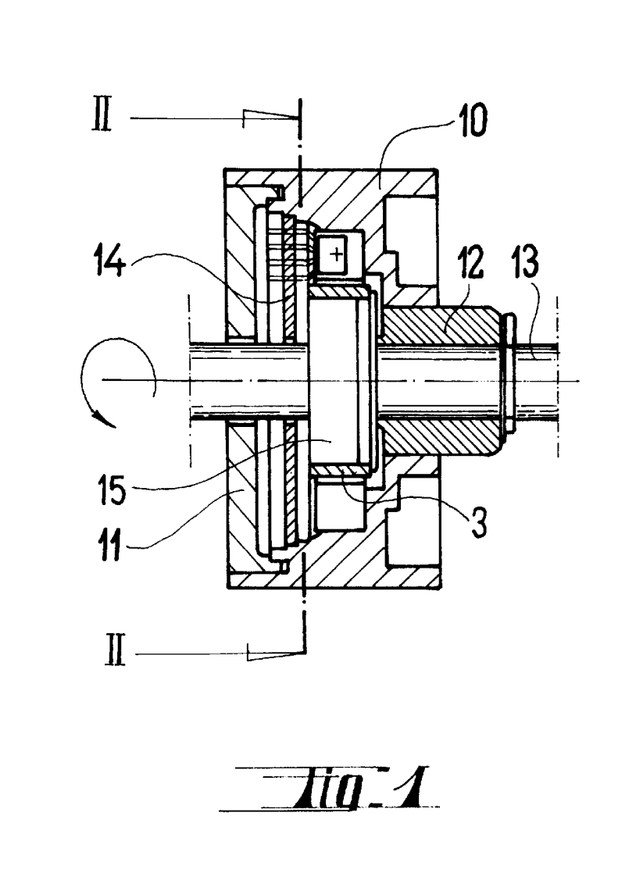
FIG. 1: is a schematically depicted longitudinal section of a rotary angle sensor according to the invention.
Figure 2:
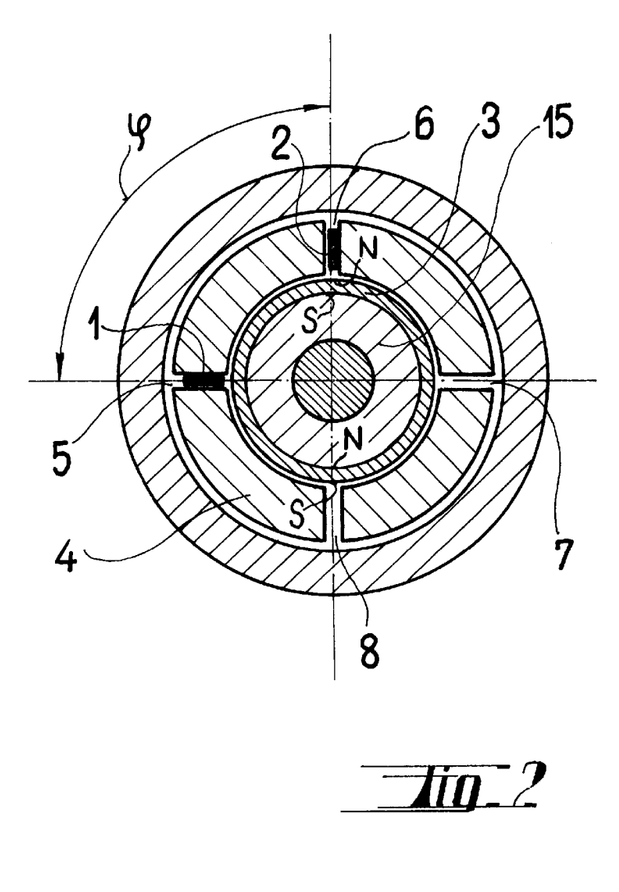
FIG. 2 is a section through a rotary angle sensor according to FIG. 1 along line II—II.

A rotary angle sensor according to the invention is shown in FIGS. 1 and 2.

It has an annular magnet element 3, which is held by an annular magnet mounting element 15, which is connected with a shaft 13, and a stator element 4, into which air gap 5, air gap 6, air gap 7 and air gap 8 (displaced from each other by angle φ of 90°) are inserted, as well as a housing 10 that surrounds the annular magnet element 3.

It is essential to the invention that a Hall IC element 1 is placed in air gap 5, and a Hall IC element 2 is placed in air gap 6. Thus both Hall IC elements 1 and 2 are offset by 90° to one another.

Both Hall IC elements 1, 2 are guided onto a printed circuit board 14, from which a CAN-BUS or an analog signal is guided outward. The housing 10 is closed by a cover 11 opposite circuit board 14. Shaft 13 moves in a bearing bush 12, which is placed in housing 10.

As FIG. 2 shows, annular magnet element 3 is in two parts. One semicircular segment has a surrounding positive (north pole) on the outside and a surrounding negative (south pole) on the inside. The second semicircular annular magnet element half has a surrounding positive (north pole) inside and a negative (south pole) on the outside. By this means a bipolar-radial annular magnet element is produced, which behaves like a rod magnet. The magnetic flux flows radially in the areas designated with N(+) and S(−). The only area where field inhomogeneities exist is in the separation area.

Figure 3:
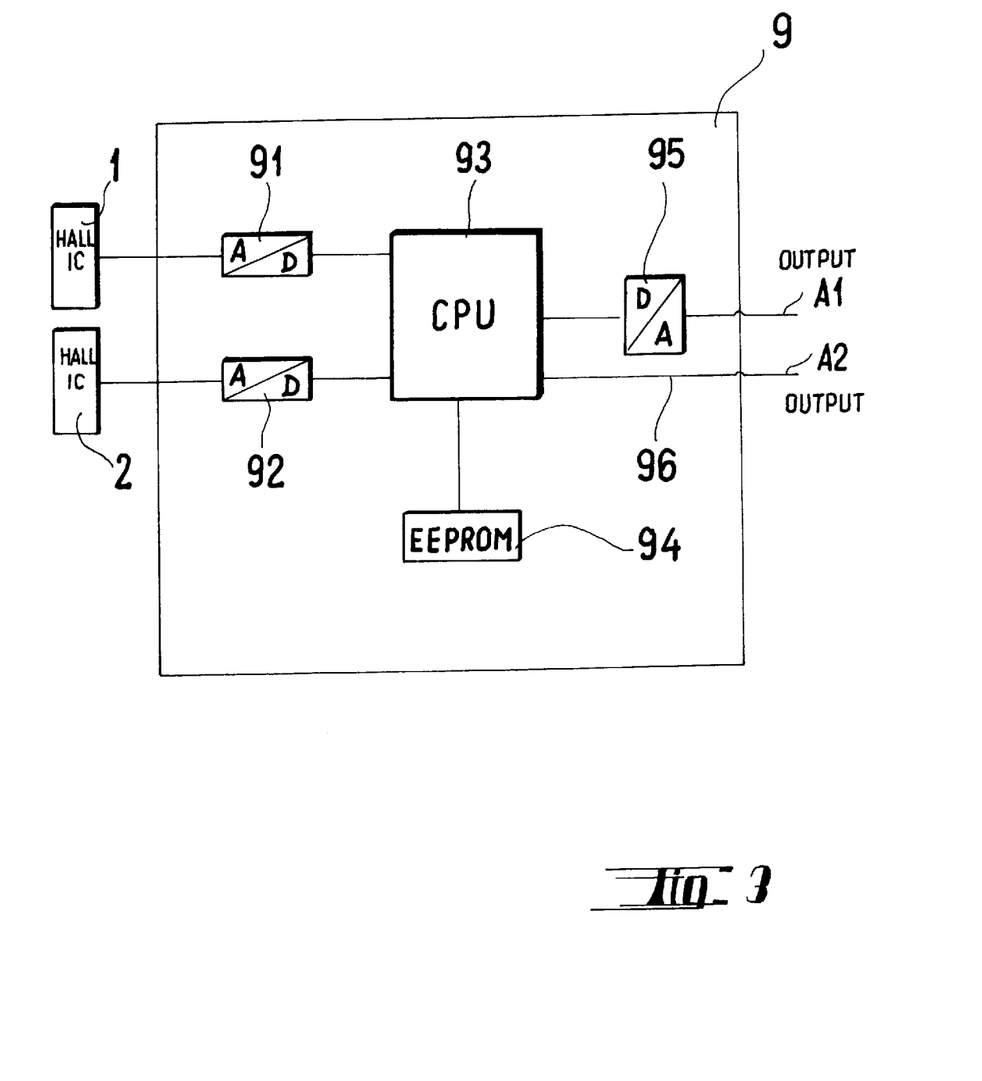
FIG. 3 is an evaluation unit for a rotary angle sensor according to FIGS. 1 and 2.

The Hall IC elements are traditional Hall measurement elements which are implemented as integrated switching circuits from time to time. The two Hall IC elements 1, 2 are connected with an evaluation unit 9 (FIG. 3).

The evaluation unit 9 consists of a computer (CPU) 93, which is linked with a memory unit 94. On the input side, an analog-to-digital converter 91 and an analog-to-digital converter 92 are provided for computer 93. Analog-to-digital converter 91 is connected to Hall IC element 1, and analog-to-digital converter 92 is connected to Hall IC element 2. On the output side, a digital-to-analog converter 95 is adjacent to computer 93. On this output side an analog output signal A1 appears. Alternatively, by way of a CAN-BUS interface 96, a digital output signal A2 can be generated.

This configuration can be implemented either through a universal microcomputer or through a user-computer switching circuit (UCSC).

If bipolar-radial annular magnet element 3 turns in the stator element 4 as per FIG. 2, a magnetic flux is emitted according to the following relation:

$$B = K \cdot \alpha T$$

where
B=magnetic flux
K=device constant, and
$\alpha T$=deflection angle.

This magnetic flux is detected by each Hall IC element 1,2 as a Hall IC voltage curve UH1, UH2.

Figure 4:
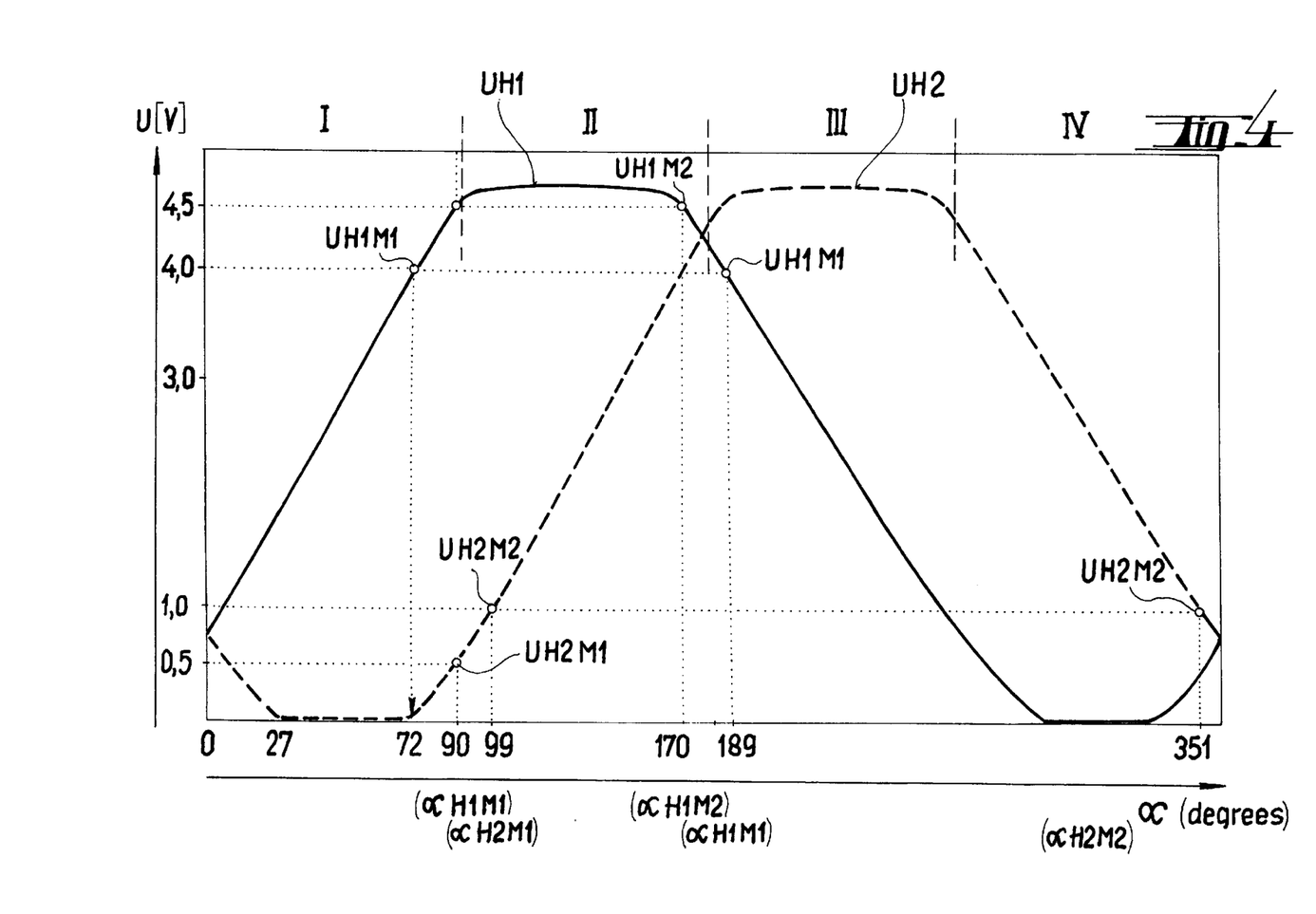
FIG. 4 is a Hall IC voltage curve of the two Hall ICs, in dependence on the position angle of an annular magnet of a rotary angle sensor connected with a shaft, according to FIGS. 1 and 2.

Hall IC voltage curve UH1, UH2 is shown in dependence on position angle a in FIG. 4. Each voltage curve has a configuration similar to a sine curve.

Hall IC voltage curve UH1 runs in linear fashion in the first quadrant I, which runs from 0° to 90°. This is adjoined by a curved and flattened section in the second quadrant II from 90° to 180°. The next straight section lies in the third quadrant III from 180° to 270°. This is followed in the fourth quadrant IV from 270° to 360° again by a flattened, curved sequence.

Hall IC voltage curve UH2 runs at a displacement of 90° from Hall IC voltage curve UH1, i.e., its flattened, curved section is located in the first quadrant, the first linear part in the second quadrant, its curved and flattened part in the third quadrant, and its linear part is then in the fourth quadrant. FIG. 4 makes especially clear the advantages of having the Hall IC elements 1,2 arrayed at 90° from each other, for a linear section lies in each quadrant, thus making possible an exact measurement of the angular position from 0° to 360°.

These two Hall IC voltage curves UH1, UH2 are inputted into the evaluation unit 9 and stored in memory unit 94. Additionally, the evaluation unit's command program is inputted into memory unit 94. It runs as follows:
A) Detection of the measured Hall IC voltage curve UH1, UH2 from each Hall IC element.
B) Assignment of each detected flux-voltage value as a position angle on the Hall IC voltage curves.
C) Computation of the actual position angles and issuance of an output signal A is determined from the position angles assigned to the flux-voltage values.

The program makes clear that one of the Hall IC voltage curves UH1, UH2 is, on the one hand, a measuring curve and, on the other hand, a decision curve. Further, the program makes it clear, (by using the aid of the decision curve) which one of the determined flux-voltage values are to be assigned to a specific angle, when one of the two Hall IC voltage curves UH1, UH2 is to be the measuring curve. The assignment can be undertaken in tabular form in memory unit 94.

Operation of this program will be explained using some flux-voltage values recorded as examples:

A flux-voltage value UH1M1 of four volts is measured by an initial measurement. This value of 4 volts often corresponds to an angle of 72° and 189° for the Hall IC voltage curve UH1. Positioning of annular magnet element 3 in stator element 4, a flux-voltage value from UH2M1 of 0.5 volts is measured by the second Hall IC element 2 and assigned an angle of 90°. The evaluation unit 9 now decides that the Hall IC voltage curve UH2 is the decision curve, and the Hall IC voltage curve UH1 is the measurement curve. In the program it is filed that for a position angle $\alpha$H2M1 at 72°, the de facto output angle is $\alpha$1, and a corresponding output signal A1, A2 is issued.

A flux-voltage value UH1M2 of 4.5 volts is measured by Hall IC element 1. The angles 90° and 170° are to be assigned to this value as $\alpha$H1M2. The second Hall IC element 2 measures a flux-voltage value UH2M2 of 1 volt, to which likewise an angle of 99° and also of 351° are to be assigned. Using the program, the logic in the form of evaluation unit 9 decides that Hall IC voltage curve UH1 is the decision curve, and Hall IC voltage curve UH2 is the measurement curve. The program concluded that for these values, the flux-voltage value UHM2 of 1 volt and the position angle $\alpha$H2M2 is to be issued as the de facto position angle $\alpha$2.

These two examples make clear the great advantage displacing the Hall IC elements by 90°. The essential thing is that measurement options of a rotary angle sensor are in fact quadrupled by expanding by one Hall IC element, as compared with the state of the art.

The decision of which curve is a measurement curve and which is a decision curve, and which value will be outputted, can be done in the form of a table. This, as already mentioned, is stored in the memory unit. The computer compares the individual values and uses the program subsequently to make the appropriate decisions.

Instead of a table, a determination can be made from the upward motion which curve is a measurement curve, and which is a decision curve. Additionally, the upward motion decides which of the values will be outputted. Tests have shown that the tabular evaluation mode is the more accurate of the two.

Figure 5:
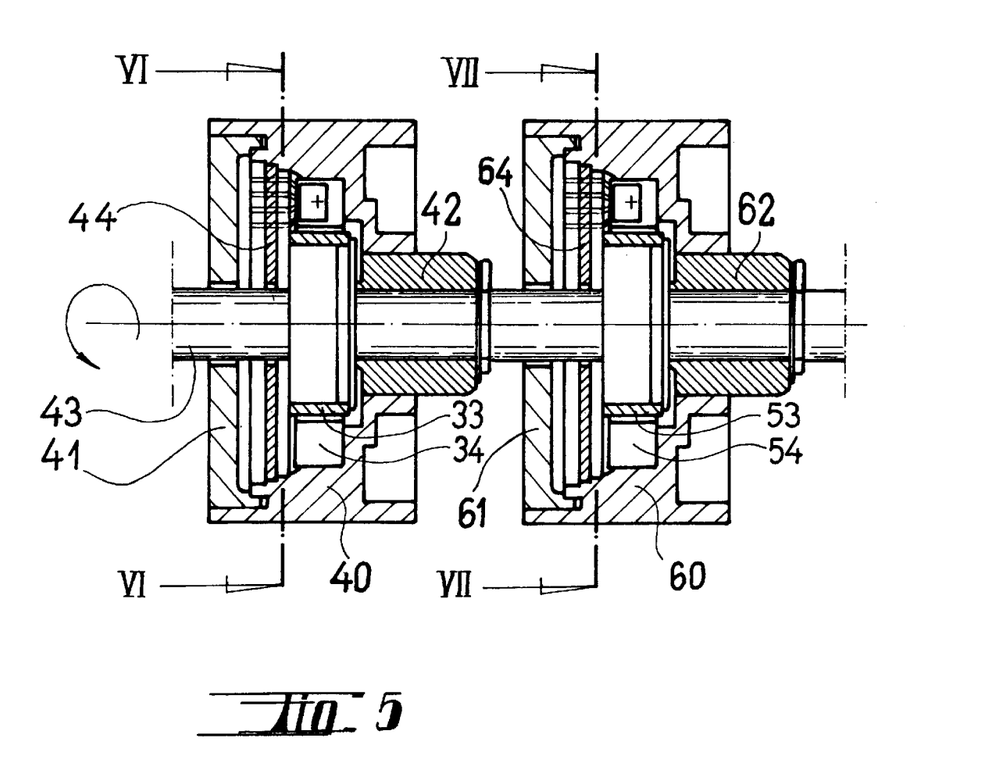
FIG. 5 is a torsion sensor formed by two rotary angle sensors placed on a shaft according to FIGS. 1 to 4.

FIG. 5 shows a torsion sensor. It consists of two rotary angle sensors placed on a shaft 43, as they already have been described.

Each rotary angle sensor has a bipolar-radial annular magnet element 33, 53, which is surrounded by a stator element 34, 54 with shaft 43. Each annular magnet element 33, 53 rotates in a stator element 34, 54, which is surrounded by a housing 40, 60, and is closed in by a cover 41, 61. A circuit board 44, 64 is positioned in front of the cover.

Figure 6:
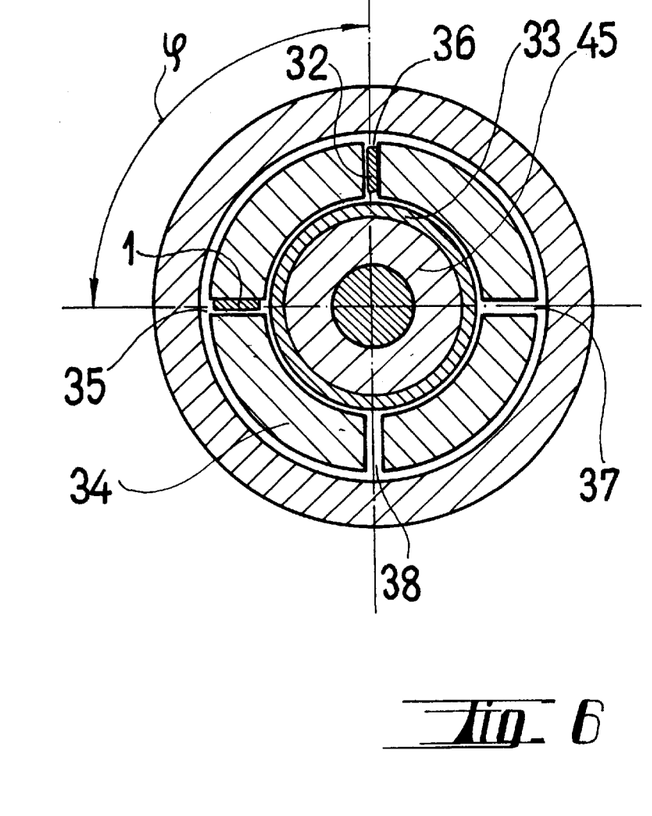
FIG. 6 is a section through the first angle sensor of a torsion sensor according to FIG. 5 along line VI—VI.
Figure 7:
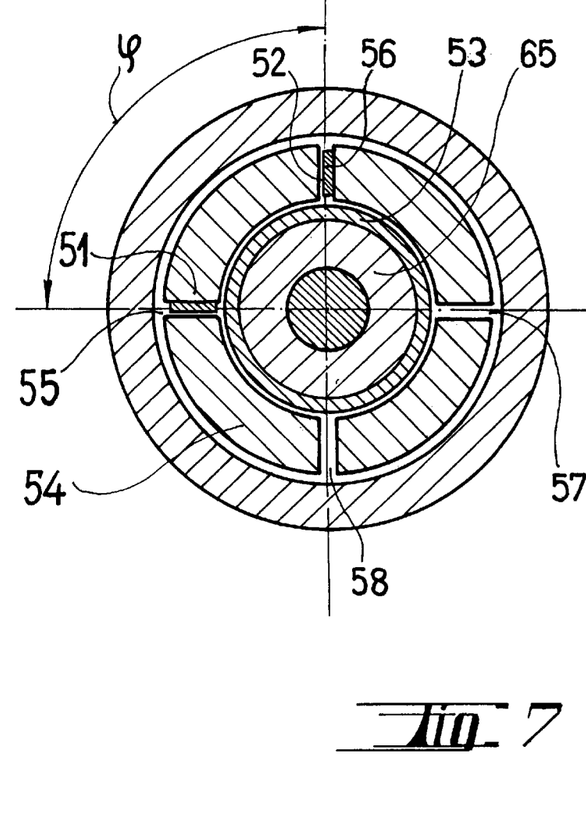
FIG. 7 is a section through the second angle sensor of a torsion sensor according to FIG. 5 along line VII—VII.

In each of the stator elements 34, 54, four air gaps 35, 36, 37, 38 and 55, 56, 57, 58 are placed, as FIGS. 6 and 7 show. In each of the adjoining air gaps 35, 36 and 55, 56, a Hall IC element is placed, so that these are likewise arrayed to be displaced from each other by an angle $\phi$T of 90°. Each of the Hall IC elements 31, 32 and 51, 52 is connected to an evaluation unit (not depicted), which is designed just like the already-described evaluation unit 9.

Figure 8:
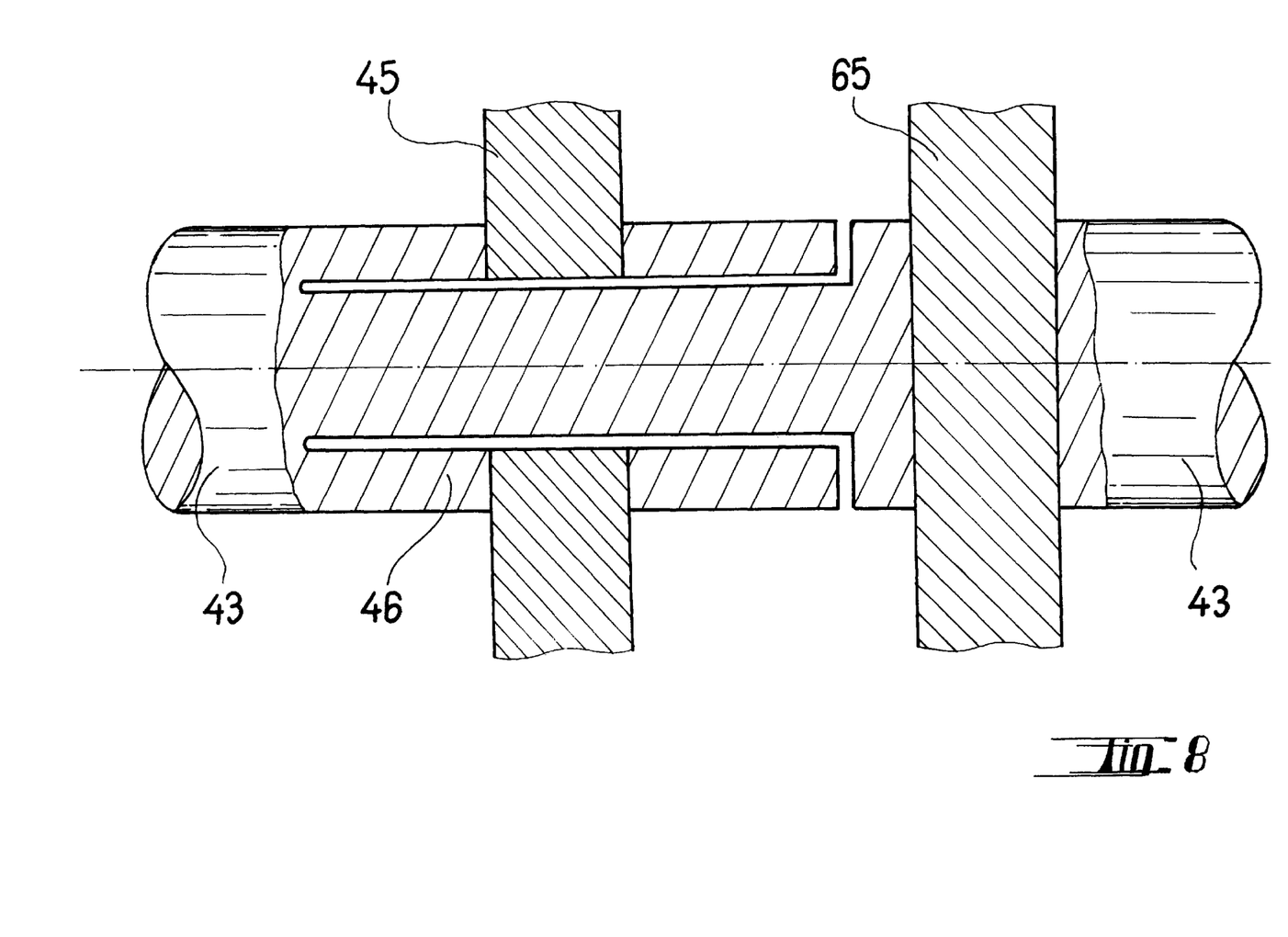
FIG. 8 is an enlarged cross section of the shaft on which the torsion sensor is placed according to FIGS. 5 to 7.

FIG. 8 shows that a tongue 46 is split off from shaft 43. The annular magnet mounting unit 45 is placed on tongue 46, and ring magnet mounting unit 65 is placed on the remaining shaft 43. Tongue 46 makes a more sensitive and exact measurement of the torsion of shaft 43 possible. Shaft 43 is surrounded by a bearing bush 62, and tongue 46 is surrounded by a bearing bush 42 (see FIG. 5).

When shaft 43 rotates, Hall IC elements 31, 32 and 51, 52 issue Hall IC voltage curves which match the Hall IC voltage curves UH1, UH2 depicted in FIG. 4. When the shaft rotates, each rotary angle sensor issues a position angle a upon attaining a position as output signal A. If there is no torsion, the two output signals will be equal. If shaft 43 rotates in tongue 46, the turning will be represented by differing output signals, whose difference is a measure of the torsion and torsion angle.

The torsion sensor described has an advantage in that the shaft's torsion and its position can be determined simultaneously. By this means, the values can be stored in memory, and inferences can be drawn about material stresses at very specific angular positions. If the torsion sensor is installed on shaft 13, redundant placement of two rotary angle sensors increases measurement certainty and accuracy. If one of the rotary angle sensors fails, the second one will assume the function of measuring the rotating shaft's position. For another thing, the output voltages of the two rotary angle sensors can also be used to guarantee a mutual monitoring of function. Such oversight can always be used to advantage if the costs for one special monitoring unit are very high in comparison with the costs of a rotary angle sensor that is manufactured in large quantities.

There has thus been shown and described a novel device for determining the position and/or torsion of rotating shafts which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Device for determining the annular position of a rotating shaft, said device comprising:
    (a) at least one bipolar-radial annular magnet element connected with the shaft, and
    (b) at least one stator element made of a magnetically conductive material,
        (1) in which the annular magnet element is placed, and
        (2) in which at least three air gaps are located, displaced one from the other at an equal angle ($\phi$), and
        (3) wherein a Hall IC element is disposed in each of two adjacent air gaps, each Hall IC element producing a flux voltage curve in response to rotation of the annular magnet element with respect to the stator element, and
    (c) an evaluation unit, connected to each Hall IC element, which
        (1) detects the Hall IC voltage curve produced by each respective Hall IC element, and
        (2) assigns each voltage value on each voltage curve to a position angle, and
        (3) from the position angles assigned to the voltage values, calculates the de facto position angle and produces an output signal representing said position angle.

2. Device according to claim 1, wherein a first and a second bipolar-radial annular magnet element is placed on the shaft, wherein each annular magnet element is surrounded by a stator element, in which at least three air gaps are situated, displaced at an equal angle ($\phi$T), and wherein a Hall IC element is disposed in two adjoining air gaps of said stator element.

3. Device according to claim 1, wherein the evaluation unit comprises (1) a microcomputer having a computer memory, and an input and output; and (2) a first and a second analog-to-digital converter, each connected between one of the Hall IC and the computer input, whereby said microcomputer produces said signal representing said position angle at said output.

4. Device according to claim 1, wherein four air gaps are disposed in each of the stator elements, displaced from each other at an angle $\phi=\phi T=90°$.

5. Device according to claim 1, wherein each annular magnet element is held by an annular magnet mounting element which is connected to the shaft.

6. Device according to is split off from the shaft and one end thereof is held in position (or that the shaft consists of two shaft parts connected to each other).

7. Device according to claim 1, wherein a stator element is placed in at least one housing.

8. Device according to claim 1, wherein the shaft comprises two shaft parts connected to each other.

* * * * *